United States Patent [19]
Schmidt

[11] Patent Number: 5,509,714
[45] Date of Patent: Apr. 23, 1996

[54] FRAMELESS CONTAINER FOR CARRYING CARGO HAVING OVERLAPPED SIDEWALLS AND A UNITARY BOTTOM SCUFF PANEL

[75] Inventor: George A. Schmidt, Langhorne, Pa.

[73] Assignee: Strick Corporation, Fairless Hills, Pa.

[21] Appl. No.: 107,269

[22] Filed: Aug. 16, 1993

[51] Int. Cl.$^6$ ................................................ B62D 33/04
[52] U.S. Cl. ........................ 296/181; 52/537; 105/401; 160/207; 220/1.5; 296/52; 296/191; 296/199
[58] Field of Search ........................ 296/181, 29, 182, 296/191, 52, 155, 193, 199, 136, 203, 183; 160/201, 206, 207; 220/1.5; 52/537, 535; 105/405, 401

[56] References Cited

U.S. PATENT DOCUMENTS

| | | | |
|---|---|---|---|
| 2,172,571 | 9/1939 | Theriault | 296/181 |
| 2,322,088 | 6/1943 | Black | 160/201 |
| 2,384,965 | 9/1945 | Reid | 296/29 |
| 4,015,876 | 4/1977 | Hulverson et al. | 296/181 |
| 4,212,405 | 7/1980 | Schmidt | 296/181 X |
| 4,357,047 | 11/1982 | Katz | 296/181 |
| 4,685,721 | 8/1987 | Banerjea | 296/191 X |
| 5,286,079 | 2/1994 | Zubko et al. | 296/181 |

FOREIGN PATENT DOCUMENTS 8300467 2/1983 WIPO ..................... 296/181

*Primary Examiner*—David M. Mitchell
*Assistant Examiner*—Kia M. Robinson
*Attorney, Agent, or Firm*—Seidel, Gonda, Lavorgna & Monaco

[57] ABSTRACT

A frameless container of a predetermined length includes a floor having floor supports, a roof, a pair of opposing sidewalls and a pair of opposing end walls. One end wall includes an access door. The sidewalls are respectively connected to the floor supports and the roof. The upper portion of each of the opposing sidewalls has at least a first and second lap-jointed panels. Each panel has predetermined dimensions for the height, width and thickness. The lower portion of each sidewall includes a scuff plate. The bottom of the scuff plate is connected to the floor supports. The top of the scuff plate extends up from the floor by a predetermined distance defining a "scuff zone." The scuff zone has a projection-free surface exposed to the interior of the container. Fasteners attach the scuff plate to the lap-jointed upper wall portion and are arranged into a horizontal row located above the scuff zone. The fasteners have low profile heads which project only slightly from the inner surface of the scuff plate.

5 Claims, 8 Drawing Sheets

FRAMELESS CONTAINER FOR CARRYING CARGO HAVING OVERLAPPED SIDEWALLS AND A UNITARY BOTTOM SCUFF PANEL

FIELD OF THE INVENTION

The present invention relates to trailers and other containers for moving cargo and, more particularly, to a frameless container with sidewalls comprising a lap-jointed multi-panel upper portion connected to a unitary plate bottom portion.

BACKGROUND OF THE INVENTION

Frameless containers for carrying cargo are known and one such container is disclosed in my U.S. Pat. No. 4,212,405 ('405) which is herein incorporated by reference. Further, a frameless container is also disclosed in copending U.S. patent application Ser. No. 07/987,925 ('925) filed Dec. 9, 1992, which issued as U.S. Pat. No. 5,286,079 on Feb. 15, 1994 assigned to the same assignee as the present invention, and also herein incorporated by reference. The '405 patent discloses a frameless container, that is, a container without posts stiffening its side panels, which is specially designed to provide an enlarged interior volume in the cargo-carrying container while at the same time providing an interior surface without protrusions that might otherwise damage cargo within the interior. The '405 patent serves its intended purpose well, but further improvements to such frameless container are desired. More particularly, it is desired to retain, as far as possible, the above outlined advantages of the '405 patent container construction, but to do this at a reduced material cost and with improved material availability.

Scuff plates to protect the inner surface of a cargo carrying container are known, and one such scuff plate is disclosed in U.S. Pat. No. 4,357,047 ('047) which is herein incorporated by reference. The '047 patent discloses a unitary uniform height scuff plate that forms the whole lower portion of the sidewall of a trailer cargo body having a relatively level floor or a sloped floor such as found in a "wedge" trailer. The upper portion of the scuff plate has a ledge upon which rest and to which are connected the trailer sidewall panels and the trailer post members which stiffen those sidewall panels.

It is desired that a scuff panel similar to that of the '047 patent be provided; however, it is further desired that such a scuff panel be provided by replacing the lower portion of a container sidewall of the type described in the '079 U.S. patent. The sidewall of the '079 patent is constructed of multiple lap-jointed plates, instead of a single unitary plate as per the '405 patent or instead of post stiffened panels as per the '047 patent. Further, it is desired that the scuff member be interconnected to the upper sidewall portion in a simple yet structurally sound manner and, more importantly, provide a relatively smooth surface facing the interior of the container that will not entangle any of the cargo or the equipment used to load or unload the cargo.

In addition to a scuff plate, it is important that the panels comprising the upper portion of the sidewalls of the container be sealed watertight at the lap joints between them and around the periphery, where they interface with and are structurally connected to other container members, so that the moisture or rain on the outside of the container does not find its way into the interior of the container.

Accordingly, it is an object of the present invention to provide means to safeguard the sidewalls of the trailer against the entrance of moisture into the interior of the trailer.

It is another object of the present invention to provide a scuff plate construction for a frameless cargo carrying container which avoids entanglement with the cargo or any related loading or unloading equipment.

Moreover, it is another object of the present invention to provide a scuff plate that is connected to the upper sidewall portion of the frameless cargo carrying container in a structurally sound manner while still providing a smooth surface that avoids entanglement with any of the cargo being carried by the container or any equipment used to load or unload this cargo.

It is a further object of the present invention to provide a unitary scuff plate and an upper sidewall portion, both being either wedge-shaped or of uniform height, which, when combined to form a complete sidewall, can be used to construct either a "wedge" or a "straight" (non-wedge) container, primarily used as a trailer cargo body.

SUMMARY OF THE INVENTION

The present invention is directed to a frameless container for carrying cargo that has a sidewall of a novel and unique construction; its upper portion comprising multiple lap-jointed metal panels; and its lower portion comprising a single piece of metal plate with the triple role of forming a watertight enclosure for the cargo, carrying the structural loads and acting as a scuff plate.

The frameless container has a predetermined length and comprises a floor having floor support means, a roof, a pair of opposing sidewalls and end walls; at least one end wall including an access door. The sidewalls have means, located at bottom and top thereof, that connect the sidewalls to the floor support means and to the roof. Each of the opposing sidewalls in its upper portion comprises at least first and second lap-jointed panels, each having predetermined dimensions for the height, width and thickness. The lower portion of each of these walls comprises a scuff plate with a thickness dimension that generally exceeds that of the lap-jointed panels, and means for fastening the scuff plate to the panels. The scuff plate has its bottom connected to the floor support means and its top extending up from the floor by a predetermined distance and defining a "scuff zone." The scuff plate has an inner surface exposed to the interior of the container. The means for fastening the scuff plate to the lap-jointed panels are arranged into at least one horizontal row located close to the top edge of the scuff plate. The means for fastening are preferably rivets with low profile heads, which facilitate the sliding of cargo over them, if such cargo is pushed along the inner surface of the scuff plate.

Other objects, advantages and novel features of the present invention will become apparent in the following detailed description of the invention when considered in conjunction with the accompanying drawings.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1:
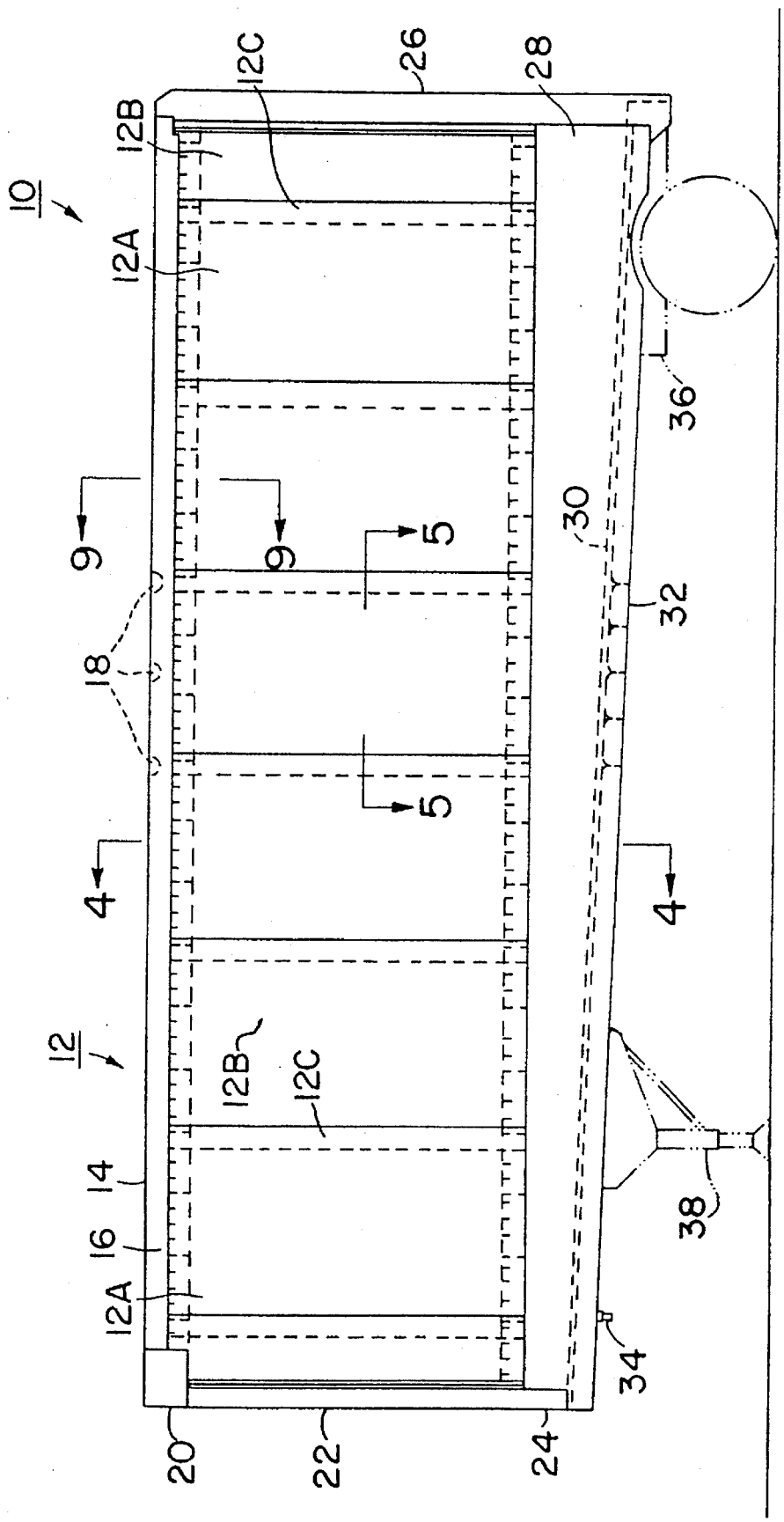
FIG. 1 is a side-elevation view of a container in accordance with one embodiment of the present invention, used as the cargo body of a trailer.

Referring to the drawings in detail, wherein like numerals indicate like elements and wherein the counterparts of such elements are designated by either primes (') or primes ("), there is shown in FIG. 1 a side-elevation view of a trailer 10. The instant invention is not restricted to a trailer as is shown in FIG. 1 (and FIGS. 2 and 3) but more broadly relates to the construction of frameless cargo-carrying containers, including but not limited to trailer bodies such as trailer 10 of FIG. 1 adapted to be suitably hauled by tractor units.

The terms "container" and "cargo-carrying container" are used interchangeably herein and each such term is meant to designate a closed, hollow structure. In one embodiment of the invention, a container may be mounted on a "chassis"; i.e., a frame, supported by a running gear ("bogie"), and transported by a suitably connected tractor unit. A bulk cargo container may be filled with a pourable bulk cargo, such as grain or plastic beads, shipped on a suitable vessel, and discharged at its port of destination. Containers may be transported, in a stacked relationship, in the hold or on a deck of a ship, on railroad cars such as flat-bed cars, or by other well-known means.

The term "trailer body" as used herein connotes one type of "cargo-carrying container," and is intended to designate a closed hollow storage unit. The trailer body as illustrated is contemplated to include provisions at the base thereof for a running gear, landing gear, and a kingpin. A trailer body is adapted to be hauled over-the-road by a tractor unit and is not usually used to transport cargo by ship or by rail, except as an entire unit with bogie attached. A typical trailer body has a substantially rectangular or square cross-section, having a length of at least about twenty-eight feet, a width of about eight feet and a height of about nine feet.

As used herein, the term "frameless" designates a trailer body or cargo-carrying container in which a substantial portion, at least about 67% and preferably at least about 75%, of the load caused by the cargo in the container, trailer body or cargo-carrying container is borne by the sidewalls of the container or trailer body. The sidewalls of the "frameless" container are substantially devoid of structural stiffening posts. The walls of a "flameless" container, trailer body or cargo-carrying container are capable of safely withstanding stresses in the range from about 15,000 p.s.i. to about 25,000 p.s.i. caused by the weight of the cargo in the container or trailer body, as well as the dynamic forces arising from the transportation of the frameless cargo-carrying container of the present invention.

With regard to FIG. 1, the trailer 10 is adapted to be pulled by a tractor. The trailer 10 includes a sidewall 12 on one side comprising panels 12A and 12B which overlap in zone 12C. An opposite sidewall (not visible in the figure) is located on the other side. The housing 10 further includes a roof 14, a top rail 16, preferably extruded aluminum, and anti-snag roof bows 18 (shown in phantom), also preferably extruded aluminum. Further, the housing 10 includes a corner fittings 20 preferably made of aluminum, a front panel 22, a front corner post member 24, and a rear frame 26.

The trailer 10 further includes a one-piece scuff plate 28, preferably fabricated from aluminum having a thickness of about 0,160 inches. The trailer 10 further includes a floor 30 which rests upon a plurality of cross sills 32. Trailer 10 is provided with a kingpin 34 at the front end, a wheel support assembly 36 (sometimes referred to as running gear or "bogie") adjacent the rear end, and a set of retractable landing gear legs 38 intermediately located between the ends of the trailer 10 forward of the wheel support assembly 36.

In the embodiment shown in FIG. 1, the trailer 10 has a sloping floor 30 that allows for more cargo to be placed at the rear of the trailer than at the front. The trailer of FIG. 1 is commonly termed a "wedge" type trailer and the scuff plate 28 is correspondingly shaped. The shaped scuff plate 28 is trapezoidal in side elevation, and has a non-uniform height which, in turn, allows the sidewall panels 12A and 12B to have a constant height. This simplifies the manufacturing of the sidewalls of trailer 10. The scuff plate 28 may be of any length sufficient to accommodate the overall length of the trailer 10. The one-piece scuff plate 28 simplifies the assembly process of the trailer 10.

This dual construction sidewall 12 is particularly suitable for short trailers, such as the approximately 28 feet long "doubles", due to the following reasons: (1) easier handling of the long one-piece scuff/bottom rail plate; (2) side marker lights at half length and top of the trailer, required in some states on trailers longer than 48 feet, would be difficult to accommodate in this sidewall construction; and (3) due to the smaller bending moment (carried by the sidewalls 12) weight and cost savings can be obtained by using a considerably thinner plate material for the upper (lapped panels, to be described) wall portion than for the lower wall portion (also to be described). The difficulty of mounting the center side marker light in the high (top) position of the trailer is primarily created because the electrical harness is usually installed in the trailer subframe, and, to tap into this harness for the connection to this marker light causes some difficulty in the present invention. The difficulty is created because the associated connection wire of the marker lamp cannot go down the sidewall, like it can on post-and-sheet type prior art trailers (either through the hollow post or through the space between the wall panel and the plywood lining). Nevertheless, the Federal (Department of Transportation (DOT)) rules require a center marker light for trailers longer than 30 feet but they also permit the mounting of this center light at the bottom edge of the sidewall, which does not present any problems in the type of trailer shown herein. However, some states mandate that this center light on trailers longer than 48 feet be mounted at the top of the trailer which would then present a difficulty to the trailers shown herein.

Figure 2:
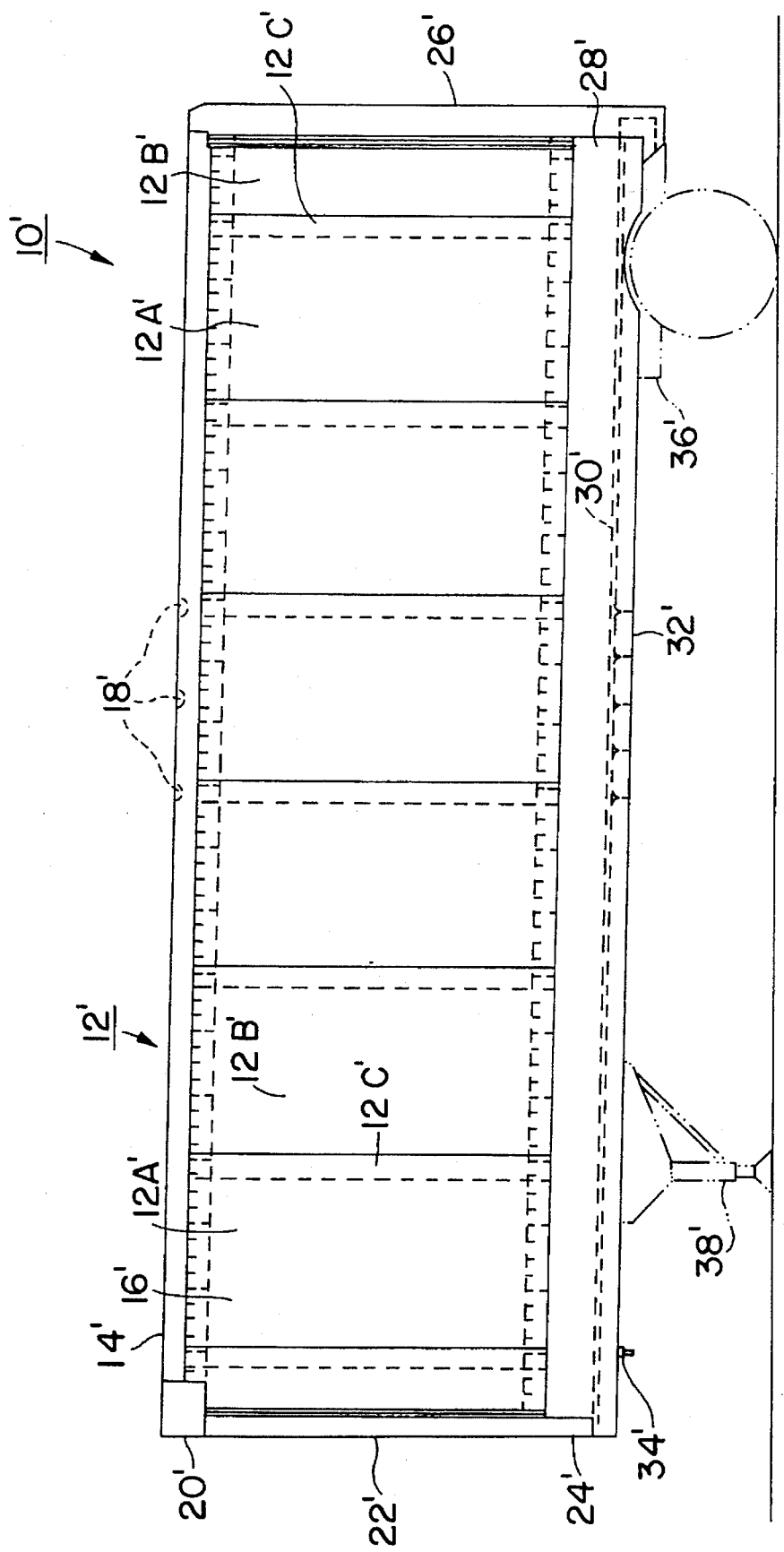
FIG. 2 is a side-elevation view of a container in accordance with a second embodiment of the present invention used as the cargo body of a trailer.

FIG. 2 is a side-elevation view of a trailer designated generally 10', in accordance with another embodiment of the present invention. The trailer 10', commonly termed a "straight" type, is similar to trailer 10, except that its floor is not sloped, nor is its scuff plate wedge shaped. Instead, scuff plate 28' is rectangular in side elevation. Except for this difference, however, scuff plate 28' is the same as scuff plate 28. Corresponding prime (') numbers relative to FIG. 1 have been applied to the embodiment shown in FIG. 2.

Figure 3:
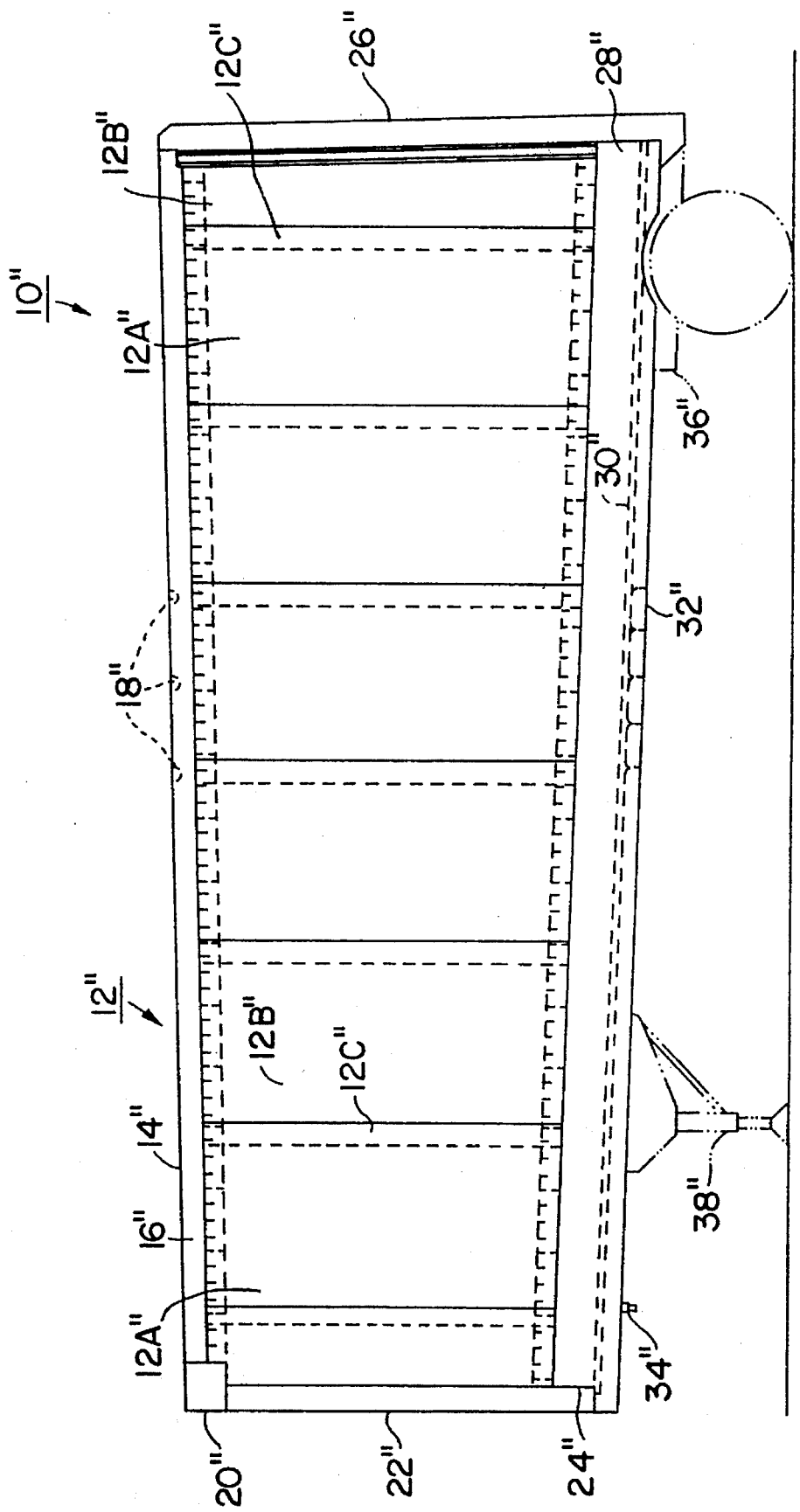
FIG. 3 is a side-elevation view of a container in accordance with a further embodiment of the present invention used as the cargo body of a trailer.

Similarly, FIG. 3 is a side-elevation view of a trailer designated generally 10", in accordance with a further embodiment of the present invention. The "wedge" type trailer 10" is similar to both trailers 10' and 10" of FIGS. 1 and 2, respectively, but differs from either trailer 10 or 10' because the upper portion of sidewalls 12" is of a non-uniform height (wedge-shaped) and its lower portion, comprising scuff plate 28", is of a uniform height, the reverse of the trailer 10, also a "wedge" type. Corresponding prime (") numbers relative to FIG. 1 have been applied to the embodiment shown in FIG. 3.

Common to the three embodiments shown in FIGS. 1, 2 and 3, is the use of a single unitary metal plate (called "scuff plate" herein) for the lower portion of the sidewall. The upper portion of the sidewall in these embodiments (as shown in FIGS. 1 through 9, and to be described hereinafter), is of a multiple lap-jointed plate construction; however, this sidewall portion could be of any other type used in trailers of conventional design, where the sidewalls have a uniform construction thru their entire height. The upper portion of the sidewall of the present invention may comprise various materials having multiple arrangements; all that is needed is, that the material and its construction or arrangement be selected so, that the overall sidewall panels of the frameless container would have the capability of withstanding the load and stress factors previously described herein. Suitable materials presently used for sidewalls of conventional trailers are 1) fiberglass reinforced plastic (FRP) covered plywood panels; 2) "sandwich" type panels, with metallic, or plastic foam core between them; 3) panels consisting of solid, plastic reinforced fiberglass with no core; and 4) one piece (non-spliced) metal plate, described in the '405 patent; used for the upper sidewall portion of the present invention, such plate can be thinner than the scuff and dent resisting plate required for the lower portion; this and the narrower width of these plates translates into cost savings as compared to the single piece sidewall of the '405 patent. The scuff plate 28", 28' or 28 may be further described with reference to FIG. 4.

Figure 4:
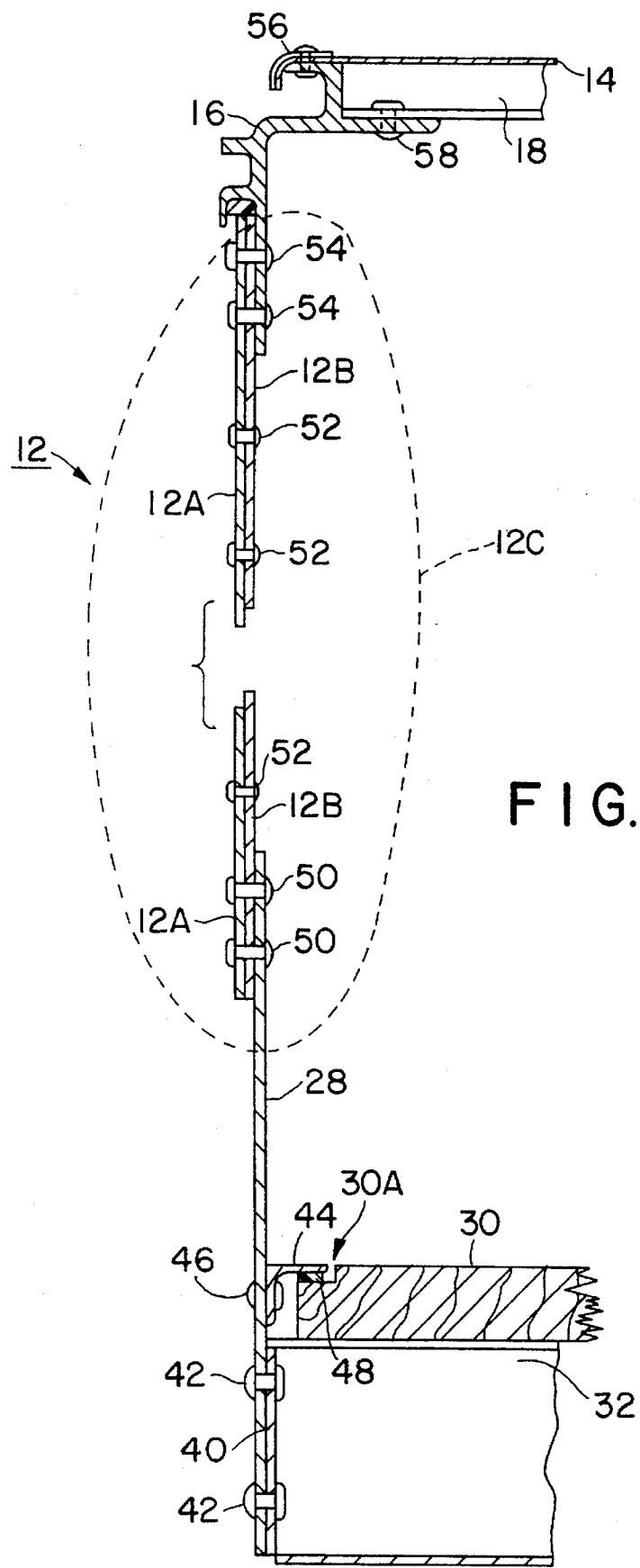
FIG. 4 is a sectional view taken along line 4—4 of FIG. 1.

FIG. 4 is a sectional view, taken along line 4—4 of FIG. 1 through the sidewall 12 of FIG. 1 and shows the floor 30 resting on sill members 32. Each sill member 32 has two end plates 40 which connect sill member 32 to the sidewalls. The sill end plate 40 is fastened to the scuff plate 28 by means of at least two, but preferably four rivets 42. The outer edge 30A of member 30 is recessed to enable it to fit under a lip member 44 which is also fastened to the scuff plate 28 by means of at least two rivets 46. An elastomeric gasket 48, acting as a sealant to prevent the entry of water or other unwanted substances into the interior of the trailer, is inserted under lip 44 and compressed between same and floor boards 30. The elastomeric gasket 48 is shown in more detail in FIG. 4A.

Figure 4A:
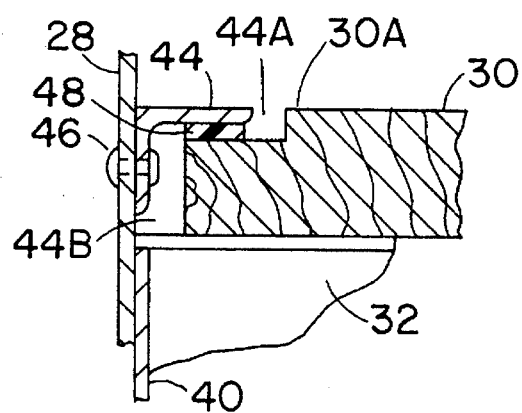
FIG. 4A illustrates details of the mating of the lip and floor members shown in FIG. 4.

FIG. 4A shows gasket 48 as filling the gap between the floor member 30 and the lip 44. FIG. 4A further shows two gaps 44A and 44B related to the lip 44 which permit expansion of floor boards 30, usually of wood, when these boards absorb moisture and swell. The scuff plate 28 to which lip 44 is connected may be further described again with reference to FIG. 4.

FIG. 4 further shows scuff plate 28 as being fastened to the overlapping panels 12A and 12B in zones 12C of sidewall 12 and between zones 12C by means of a plurality of rivets 50. The overlapping or lap-jointed panels 12A and 12B are similarly fastened to each other by means of a plurality of rivets 52. The terms "overlapping" and "lap-jointed" are used herein in an interchangeable manner. The overlapping panels 12A and 12B are fastened to each other and to the top rail member 16 by a further plurality of rivets 54. The top rail 16 is connected to roof 14 by means of a plurality of attachment means 56. The top rail 16 supports the roof bow members 18 and is connected thereto by attachment means 58. The top rail 16 will be further described below, with reference to FIG. 9. The overlapping panels 12A and 12B and the scuff plate 28 may be the same material such as aluminum. The scuff plate 28 is normally of a thicker gauge than the panels 12A and 12B; however, if the scuff plate 28 is made of a stronger material than that of the panels, for example, steel, or if the panels 12A and 12B use a weaker material, for example, plastic laminate, then the thickness ratio is reversed; i.e., the panel thickness exceeds that of the scuff plate. The overlapping panels 12A and 12B shown in FIG. 4, of the sidewalls 12 of FIG. 1 and also of the sidewalls 12' and 12" of FIGS. 2 and 3, have alternative embodiments to be described with reference to FIGS. 5 and 6, both being sectional views taken along line 5—5 of FIG. 1.

Figure 5:
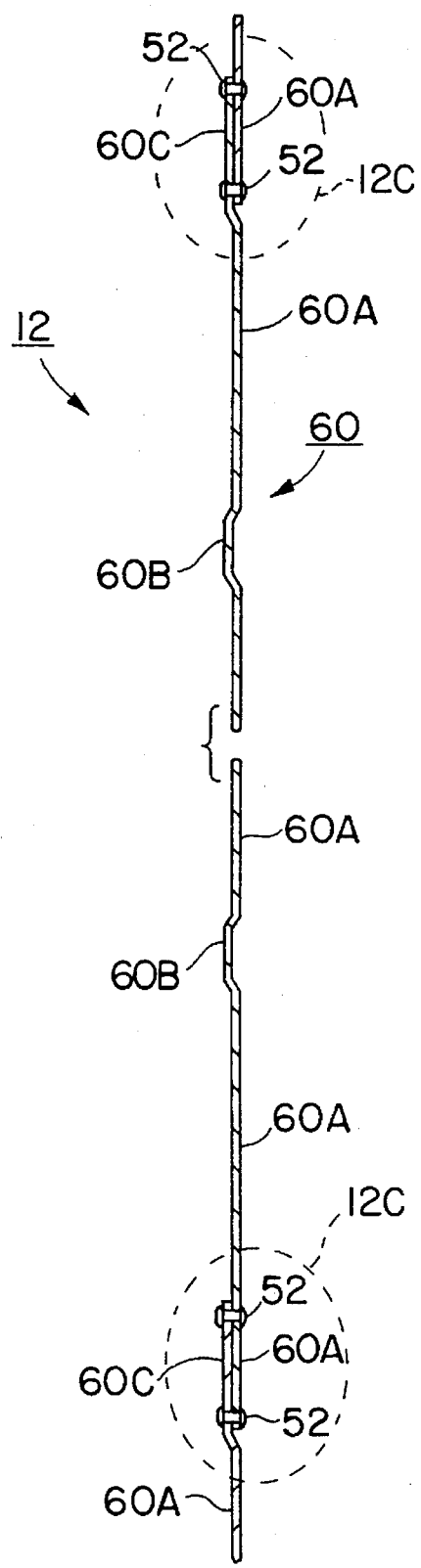
FIG. 5 is a sectional view of an alternative arrangement of the sidewalls of the container taken along line 5—5 of FIG. 1.

FIG. 5 illustrates the sidewall 12 as comprising a plurality of panels 60 having at least one planar portion 60A, at least one closed-offset portion 60B, and at least one open-offset portion 60C. As seen in FIG. 5, the closed-offset portion 60B, commonly referred to as being corrugated, first deviates (offsets itself in an angular manner) from the planar portion 60A to run parallel with it, but then returns from such deviation to again be in alignment with the planar portion 60A. In contrast, open-offset portion 60C deviates (offsets itself in an angular manner) and runs parallel to but never returns into alignment with planar portion 60A. The planar portion 60A and the open-offset portion 60C of adjacent panels are brought together at zone 12C and fastened together by rivets 52. The corrugated portion 60B serves as a stiffening and strengthening means. Corrugations, such as 60B (FIG. 5) or 62B (FIG. 6 to be described) increase both the moment of inertia ("I") and the section modulus ("Z"); increases of "I" make the panel stiffer (less deflection for a given load, thus also greater resistance to buckling failure); and increases of "Z" make the panel stronger (lower stress for a given load, thus ability to resist higher load).

Figure 6:
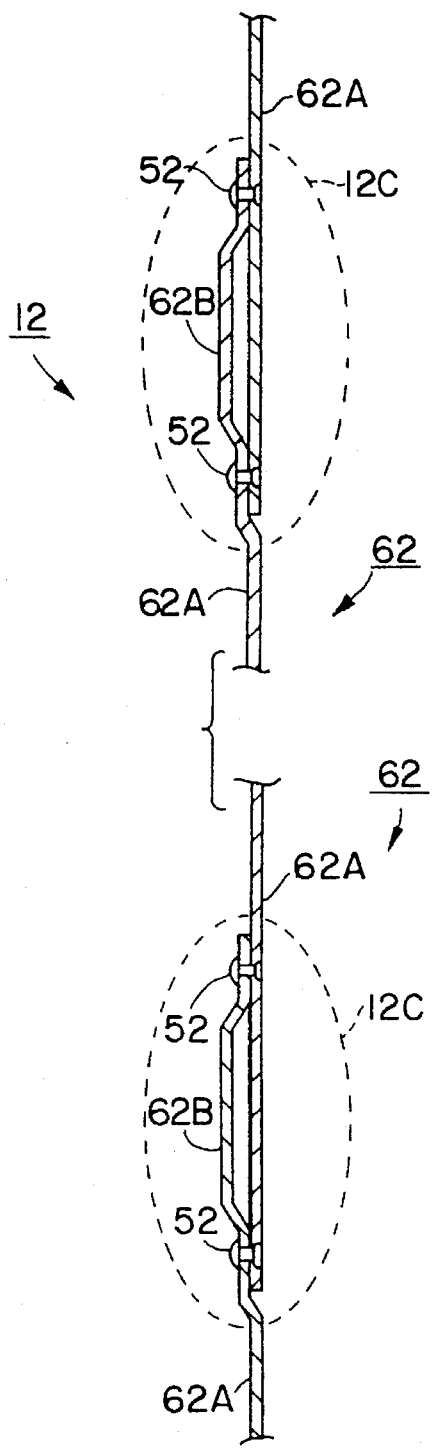
FIG. 6 is a sectional view of another alternative arrangement of the sidewalls of the container, again taken along line 5—5 of FIG. 1.

A further embodiment of sidewall 12 shown in FIG. 6 also includes stiffening and strengthening means. FIG. 6 shows a sidewall 12 comprising a plurality of panels 62 each of which in turn comprises a first planar portion 62A and a closed-offset or corrugated portion 62B which serves to strengthen and stiffen the sidewall 12 in the overlap zones in the same manner as the closed-offset portion 60B of panel 60 between the overlap zones. The planar portion 62A and the corrugated portion 62B from two separate panels 62 are brought together in zone 12C and fastened by rivets 52.

Figure 7:
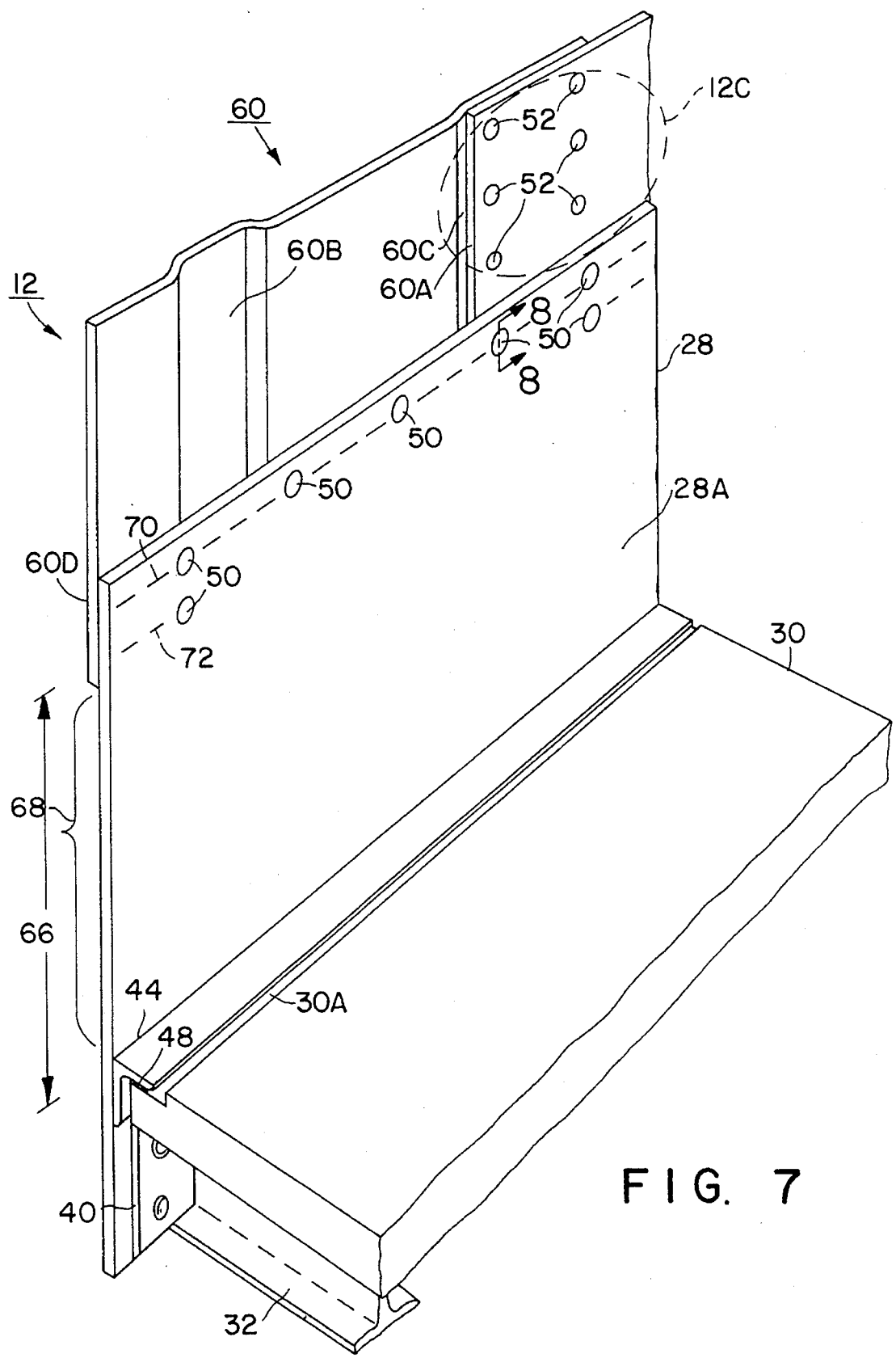
FIG. 7 is a perspective view illustrating the interconnection of the lap-jointed sidewall portion and scuff plate portion of the present invention.

FIG. 7 illustrates the panel 60 of sidewall 12 as having a lowermost portion 60D that overlaps and is fastened to scuff plate 28 by means of rivets 50, as previously described with reference to FIG. 4. Similarly, the scuff plate 28 abuts the end plates 40 of the sill members 32. It should be noted that FIG. 7 shows only one sill member 32 supporting floor 30 whereas, in actuality, a plurality of sill members 32 and their end plates 40 are equally spaced apart from each other and support the floor 30 along its full length.

In cargo containers and trailer cargo bodies the cargo load stresses their sidewalls in bending. In conventional design containers and trailer bodies the compression and tension loads, imposed by such bending, are carried, respectively, by the top and bottom rails, which therefore are full length, continuous structural shapes made of metal, usually aluminum or steel. The shear loads of such bending are carried by the sidewall panels located between the top and bottom rails and structurally connected to them; these panels are constructed in a number of different ways, and are made of a number of different materials, such as discussed above.

These sidewalls panels, not being resistant to dents, gauges, tears, scratches, etc., caused by cargo loading equipment or the cargo itself, in the zone most prone to such damage are usually protected there by "scuffboards," i.e., continuous or multiple piece metal plates, usually corrugated for additional strength, or boards of hardwood, both attached to sidewall panels.

In the present invention the conventional "bottom rail" and the continuous metal "scuff board" have been replaced by a single part, the "unitary bottom scuff panel," which fulfills the roles of both of these conventional parts. The advantages are simpler manufacture and smaller encroachment into the load space of the cargo container or the trailer cargo body. Also, since the "unitary bottom scuff panel" of the present invention, instead of simply coveting the lower sidewall, like the "scuff board" does, replaces it structurally, the height of the conventional design sidewall panel is only required for the upper portion of the sidewall, thus saving both cost and weight. In the rare cases, where purely aesthetic considerations, such as a requirement for an unbroken sidewall surface to accommodate standardized decorative painting and/or decals, would outweigh the aforesaid savings, the conventional sidewall panel can, of course, be extended down to cover the whole "unitary scuff bottom panel"; this extension would play no structural role as the tension would still be carried by the "scuff bottom panel."

The scuff plate 28 relating to the present invention is preferably a long, single piece of an aluminum plate. This preferred scuff plate is heavily stressed in tension at its bottom edge. Therefore, it is not desired to make the scuff plate in several shorter pieces welded together because welded joints and the heat annealed aluminum next to the joints reduce its strength to carry tension. However, if the material used to make the scuff plate is steel of the type which does not lose much strength in the welded joints (so-called High Strength Low Alloy (HSLA) steel), it is possible to make an acceptable strength scuff plate from several pieces. Also, although it would add considerable weight and cost, a scuff plate made from several pieces joined by riveted or bolted splice members could be possibly developed (with some functional sacrifices).

Still referring to FIG. 7, the scuff plate 28 has its inner surface 28A exposed to the interior of the trailer 10 and, by forming the lower portion of the sidewall, makes it resistant to damage inflicted by goods within the trailer 10 striking and/or scraping along the sidewalls and also resistant to damage inflicted by equipment, such as forklift trucks, loading or unloading cargo on and off the trailer 10. The scuff plate 28 extends upward from the floor 30 by a predetermined distance 66 in the range of about 8 to 24 inches but preferably not less than 16 inches. The predetermined distance encompasses an area that defines a "scuff zone" indicated by reference number 68 as shown. Each panel 60 has its lowermost portion 60D above the scuff zone and, therefore, the panel 60 need only have a thickness that is based solely on a structural (beam) loads that are carried by the sidewalls. Any additional thickness that would have to be added to the panel 60, if it would extend all the way down to the floor, to provide for dent and tear resistance to safeguard against any damage typically inflicted by the cargo is not required with the present invention.

The thickness of scuff plate 28 projects inward from the surface of the wall above it and thus provides protection for panel (50; scuff plate 28 also has means for attachment to the overlapping panels 12, such means comprising at least one, preferably two, horizontal rows 70 and 72 of rivets 50. These rivets 50 should, however, avoid entanglement with the cargo and loading/unloading equipment in the infrequent cases, when sliding contact occurs above the normal "scuff zone" defined by distance 66. Rivet 50 is further described by reference to FIG. 8.

Figure 8:
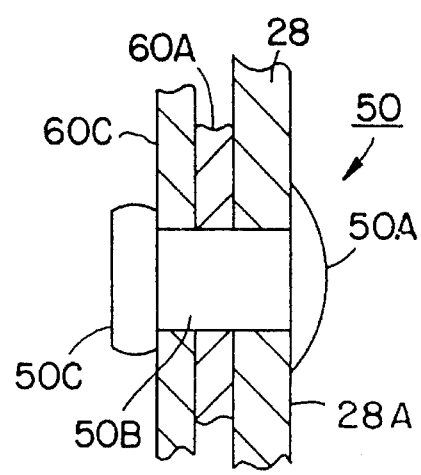
FIG. 8 is an enlarged illustration of fastening means used to make the interconnection illustrated in FIG. 7.

FIG. 8 illustrates a low head profile rivet 50 fastening portions 60C, 60A of panel 60 to the scuff plate 28. The rivet 50 comprises a first head portion 50A and a shank 50B having an extension that is "bucked" (hammered or pressed down) to form a second head portion 50C. Head 50A provides a smooth profile that projects only slightly from the inner surface 28A. This smooth "feathered edge" profile avoids entanglement with any objects that may infrequently come into sliding contact with the upper edge of inner surface 28A.

The present invention reduces the cost of the sidewalls by doing away with any unnecessary thickness in the sidewall panels and eliminates the need to recess the associated rivets by locating these rivets above the scuff zone. Moreover, the sidewall upper portion panels may have a uniform height even when these panels are used for wedge shaped trailers or containers. As an alternative and as shown in FIG. 3, uniform height scuff plate may be used in combination with wedge-shaped upper sidewall portion, if so desired.

Figure 9:
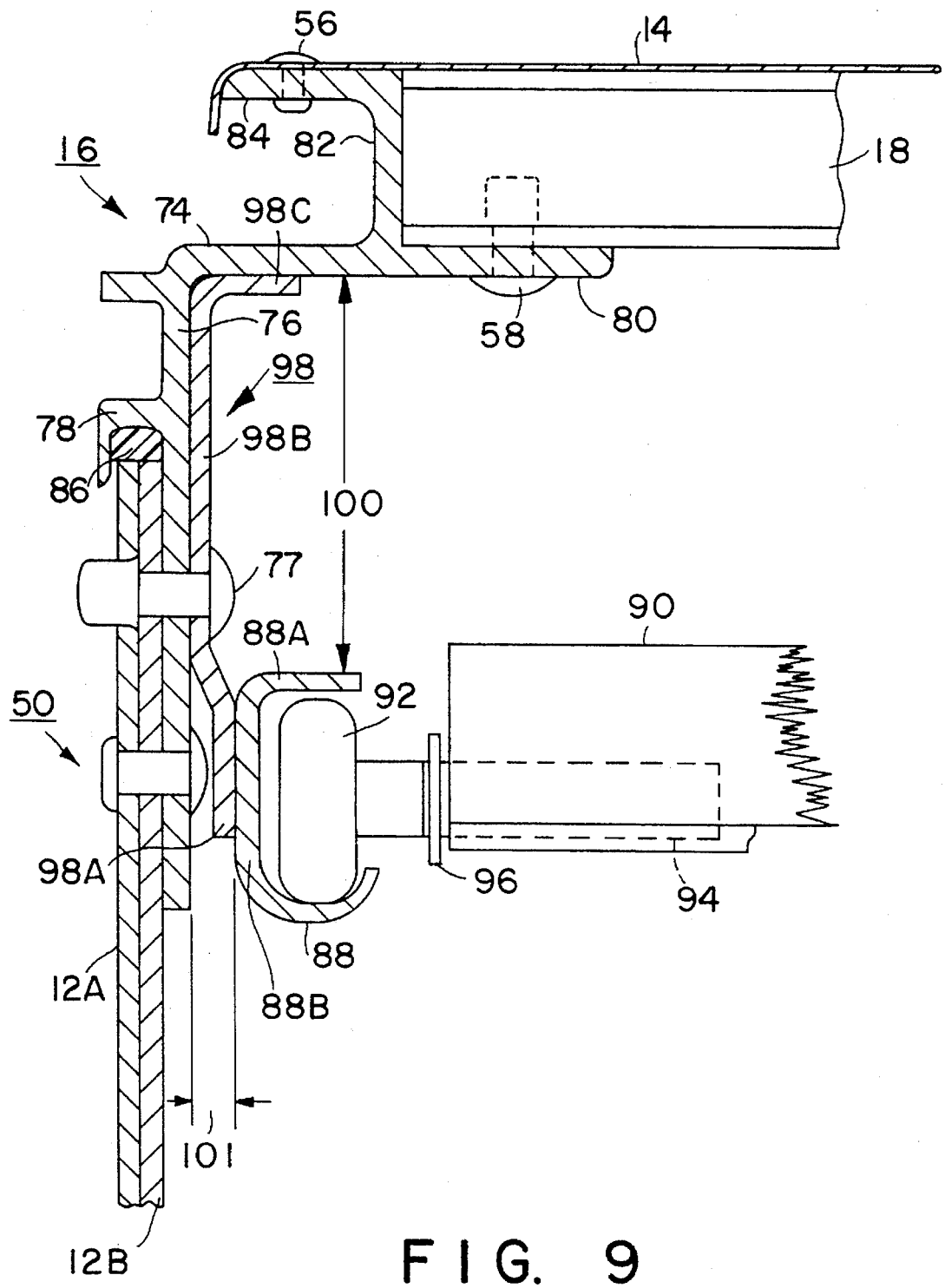
FIG. 9 is a sectional view taken along line 9—9 through the top rail 16 of FIG. 1, top rail 16' of FIG. 2, or top rail 16" of FIG. 3.

Further details of the present invention will now be described with reference to FIG. 9. FIG. 9 is a cross-sectional view of the upper rail 16, 16' and 16" taken along line 9—9 of FIG. 1, FIG. 2 and FIG. 3, respectively, and shows a low head profile rivet 50 fastening the lower portion of the upper rail 16 to the upper portions of the first and second overlapping panels 12A and 12B (previously discussed with reference to FIG. 4). The top rail 16 has a main horizontal web portion 74, a dependent vertical web portion 76 to which rivet 50 and a rivet 77 are both fastened, and a lip 78 which overlaps the upper edges of panels 12A and 12B so as to direct water away from these panels. The top rail 16 further comprises a ledge 80 that extends inwardly of a vertical web portion 82. Ledge 80 supports roof bow members 18 which are fastened to the ledge 80 by fastening means 58 (also shown in FIG. 4). The top rail 16 further has an upper, horizontally outwardly extending portion 84 over which the edge portion of roof sheet 14 drapes. As discussed with reference to and as also seen in FIG. 4, the roof sheet 14 is fastened to the overhanging section 84 by attachment means 56.

As seen in FIG. 9, the top edges of the sidewall panels 12A and 12B fit underneath the lip edge 78 of the top rail 16. This lip 78 accommodates an elastomeric seal 86 which is compressed by the top edges of panels 12A and 12B and also lodged under lip 78. The seal 86 provides watertight mating of the upper rail 16 with the sidewalls 12. The upper rail 16, in particular the bottom surface of web portion 74 that faces the interior of the trailer 10, is used as a reference plane for accurately mounting access door tracks 88 of trailer 10.

An access door 90 is shown in its open horizontal, under-the-roof position and is an overhead "garage" type, comprising multiple horizontal panels joined to each other by hinges (not shown) and having roller members 92 attached to each of its sides by shafts 94 with thrust collars 96. Roller members 92 run in tracks 88, which have a "C"-shaped cross section and an inverted "L" overall configuration, with the vertical legs of the "L" straddling the door opening on the inside. The horizontal legs of track 88 (shown in FIG. 9) are located a predetermined distance 100 below the roof of the trailer, such distance providing sufficient clearance for the door and its locking hardware (not shown) with the roof, when the door is rolled from its closed (vertical) position to its open (horizontal) position, and, at the same time, positioning the door in its open position as close to the roof as possible to minimize encroachment into the load space of the trailer 10 (or 10' or 10").

Element 98 is a clip member comprising portions 98A, 98B and 98C. Portion 98A is attached by appropriate means, such as welding, to back portion 88B of track 88 while holding dimension 100; portion 98B, offset from portion 98A laterally by dimension 101, has at least one hole for attaching the clips, and thus the whole horizontal leg of the track 88, to trailer upper rail 16 by the means of fasteners, preferably rivets 77; finally, portion 98C, at 90° to portion 98B, contacts horizontal web portion 74 of top rail 16.

At installation the horizontal leg of track 88 with attached clips 98 is pushed outward and upward, until portions 98B of the clips contact the vertical web portion 76 of the top rail and portions 98C contact the horizontal web portion of this rail; then, while held in this position, holes for rivets 77 are transfer drilled from holes in clips thru the vertical web portion of the top rail, and rivets 77 installed in these holes. Thus the track has been secured in the exact desired position, defined by dimensions 100 and 101, without any measuring or using special installation aids, which would be difficult due to the limited access.

It will be appreciated that the present invention provides for clip members 98 which allow for a convenient, easy and accurate mounting of the tracks 88.

The present invention may be embodied in other specific forms without departing from this spirit or essential attributes thereof and, accordingly, reference should be made to appended claims, rather than the foregoing specification as indicating the scope of the invention.

I claim:

1. A frameless container for carrying a cargo with a known load and having a predetermined length comprising:

a floor having floor support means, a roof, a pair of opposing sidewalls and a pair of end walls, at least one end wall including an access door, said sidewalls having means located at the top and bottom thereof that are respectively connected to said floor support means and to said roof, the upper portion of each of said opposing sidewalls including at least a first and second lap-jointed panels each having predetermined height, width, and thickness dimensions, the lower portion of the side walls having a scuff plate, the scuff plate having its bottom connected to said floor support means and its top extending up from the floor by a predetermined distance to define a scuff zone, the scuff zone having a projection-tree surface exposed to the interior of said container, said scuff plate having a predetermined thickness relative to the thickness of each of said first and second lap-jointed panels, fastening means for fastening said scuff plate above the scuff zone to said lap-jointed first and second panels, said fastening means arranged in at least one horizontal row located above said scuff zone, said fastening means having low profile heads projecting only slightly from said exposed inner surface of the scuff plate so as to avoid entanglement with cargo carried by said frameless container, a top rail interconnected between said roof and the side wall, said top rail having a portion of an inner surface exposed to the interior of said container and a portion of an outer surface exposed to the exterior of the container; said top rail including a main horizontal web portion, a vertical web portion having a lower dependent web depending from the main horizontal web portion and an upper segment projecting upward from the main horizontal web portion, a ledge portion extending inwardly of the upper segment of the vertical web portion, a lip portion carried by the lower dependent web of the vertical web portion, an upper horizontal, outwardly extending portion carried by the upper segment and overlying the main horizontal web portion, and said dependent web portion adjacent to and running along the inner side of said lip portion, said dependent web portion having at least one hole for accepting fastening means that join said first and second panels to said dependent web portion, the access door is a generally vertically moving, roll-up door, the door having roller members attached to each opposite side of said access door, said roller members engaging "C"-shaped guide tracks to allow the access door to be rolled from its lower closed position to its upper open position, in the closed position said door rests in and is supported by said guide tracks parallel to the container roof and at a predetermined, functionally critical distance below it, and a plurality of clip members which are shaped to be contoured to one surface of said dependent web portion of the top rail and to one surface of the guide tracks for positioning of the guide tracks at the predetermined distance below roof, prior to permanent attachment to the container top rail, a portion of said clip members for attaching to said one surface of said dependent web portion and to said one surface of said guide tracks have at least one hole for accepting a fastener and said clip members being positioned so as to extend vertically upward to contact a designated inside surface of the container's top rail, each of said clip members serving as a gauge for easily and accurately locating said guide tracks at said predetermined distance below the container roof during installation.

2. A cargo container having a predetermined length comprising:

a floor having floor support means, a roof, a pair of opposing sidewalls and a pair of end walls, said sidewalls having means located at the bottom and top thereof that are respectively connected to said floor support means and to said roof, the upper portion of each of said opposing sidewalls including at least a first and second lap-jointed panels each having predetermined height, width, and thickness dimensions;

a top rail interconnected between said roof and the side wall, said top rail having a portion of an inner surface exposed to interior of said cargo container;

an access door of the generally vertically moving, roll-up door type, the access door having roller members attached to an upper portion of each opposite side of said access door, each of said roller members being arranged within guide means to allow the access door to be moved up and down, and wherein said guide means includes (i) a pair of tracks each having an inner surface and a top portion and vertically arranged in respective corners between each opposite sidewall and one of said end walls, each of said inner surfaces of said pair of tracks guiding its respective roller; and (ii) a pair of clip members each with a predetermined vertical length respectively interconnected to said pair of tracks and having at least one hole therein and an offset portion connected to said top portion of said track, each of said clip members comprising an extension portion that runs against an inner surface of said top rail, said arrangement of said clip members and said top rail as well as the predetermined vertical length of said clip members being selected so that said tracks are fixed at a predetermined distance relative to said top rail; and a lower portion of said sidewalls including (i) a scuff plate having its bottom connected to said floor support means and its top extending up from the floor by a predetermined distance to define a scuff zone with a projection-free surface exposed to the interior of said cargo container, said scuff plate having a predetermined thickness relative to the thickness of each of said first and second lap-jointed panels; and (ii) fastening means for fastening said scuff plate to said overlapped first and second panels, said fastening means arranged in at least one horizontal row located above said defined scuff zone, said fastening means having a head portion substantially flush with said exposed inner surface for avoiding entanglement with cargo carried by said cargo container.

3. A trailer according to claim 2, wherein said scuff plate is of a unitary construction.

4. A trailer according to claim 2, wherein said scuff plate comprises a plurality of pieces that are welded together.

5. A cargo container having a predetermined length for carrying cargo comprising:

a floor having floor support means, a roof, a pair of opposing sidewalls and a pair of end walls, said sidewalls and end walls each having means located at the bottom and top thereof that are respectively connected to said floor support means and said roof, the upper portion of each of said opposing sidewalls comprising at least first and second lap-jointed panels each having predetermined height, width, and thickness dimensions;

a top rail member interconnected between said roof and the side wall said top rail having a portion with an inner surface exposed to the interior of said cargo container and a portion of an outer surface exposed to the exterior of the container, said top rail includes a main horizontal web portion; a vertical web portion having a lower dependent web portion depending from the main horizontal web portion and an upper segment projecting upward from the main horizontal web portion; a ledge portion extending inwardly of the upper segment of the vertical web portion; a lip portion carried by the lower dependent web of the vertical web portion; an upper horizontal, outwardly extending portion carried by the upper segment of the vertical web portion and overlying the main horizontal web portion; and said dependent web adjacent to and running along the inner side of said lip portion, said dependent web portion extending downward to contact and overlap one of said first and second overlapping panels, said dependent web portion having at least one hole for accepting fastening means that joins said first and second overlapping panels to said dependent web portion;

an access door having opposite sides located in one of the end walls and being generally vertically moving, roll-up door, the door having a roller member attached to an upper portion of each of said opposite sides of said access door;

guide means accepting each of said roller members and including (i) a pair of tracks each having an upper surface and a top portion and vertically arranged in respective corners between each opposite sidewall and one of said end walls, each of said inner surfaces of said tracks guiding its respective roller; and (ii) a pair of clip members each with a predetermined vertical length and respectively interconnected to said pair of tracks and having at least one hole therein, each of said clip members comprising an offset portion connected to said top portion of said track, an extension portion that runs against an inner surface of a major portion of said dependent web, and an upper portion that runs against a portion of an inner surface of said main horizontal web portion, said arrangement of said clip members and said top rail as well as the predetermined vertical length of said clip members being selected so that said tracks are fixed at a predetermined distance relative to said main horizontal web portion of said top rail; and a lower portion of said sidewalls including (i) a scuff plate having its bottom connected to said floor support means and its top extending up from said floor support means by a predetermined distance to define a scuff zone, the scuff zone having a projection-free surface exposed to the interior of said cargo container, said scuff plate having a predetermined thickness relative to the thickness of each of said first and second lap-jointed panels; and (ii) fastening means for fastening said scuff plate above the scuff zone to said overlapped first and second panels, said fastening means arranged in at least one horizontal row located above said scuff zone, said fastening means having a head portion substantially flush with said exposed inner surface of the scuff plate, whereby said exposed inner surface avoids entanglement with cargo carried by said cargo container.

* * * * *